INVENTORS
ALFRED WINKLER
WILFRIED HOFMANN
KARL DEEG

BY

Michael J. Striker

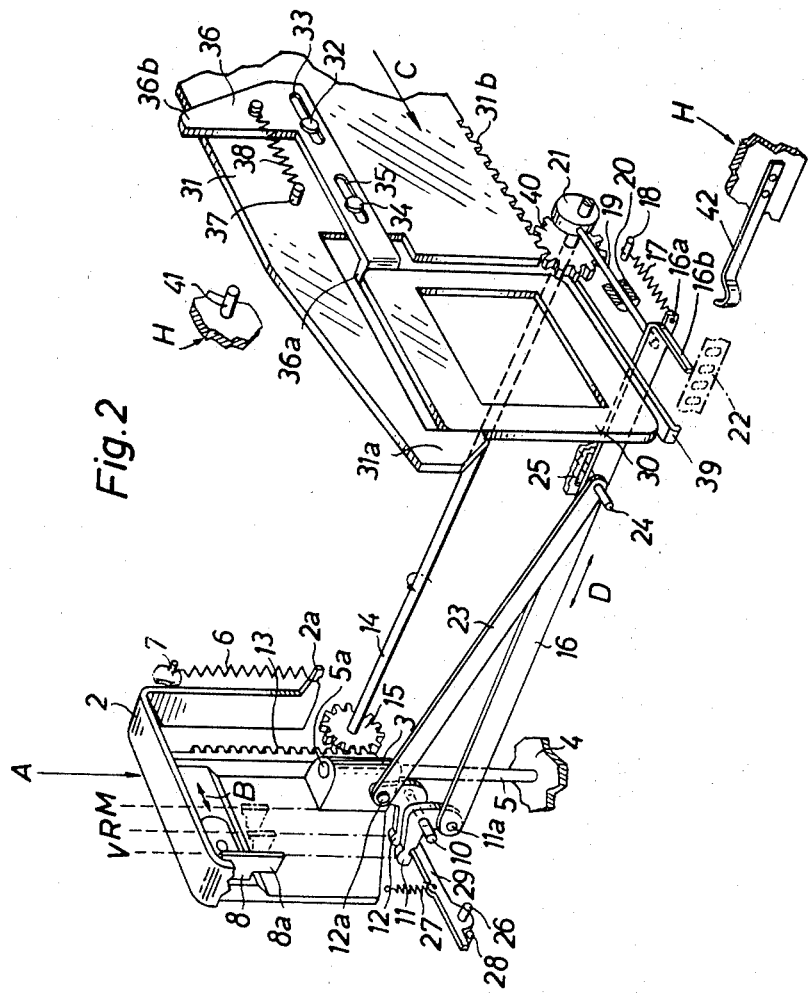

3,395,474
SLIDE PROJECTOR
Alfred Winkler and Wilfried Hofmann, Munich, and Karl Deeg, Unterhaching, near Munich, Germany, assignors to Agfa-Gevaert Aktiengesellschaft, Leverkusen, Germany
Filed Jan. 21, 1966, Ser. No. 522,287
Claims priority, application Germany, Feb. 5, 1965, A 48,331
12 Claims. (Cl. 40—79)

ABSTRACT OF THE DISCLOSURE

A slide projector wherein a vertically reciprocable actuating member is mounted in a recess at the rear wall of the housing and carries a horizontally reciprocable selector serving to set the magazine transporting mechanism for forward or reverse operation. The actuating member initiates movements of the magazine and the transfer of slides into and from the magazine.

---

Figure 1:
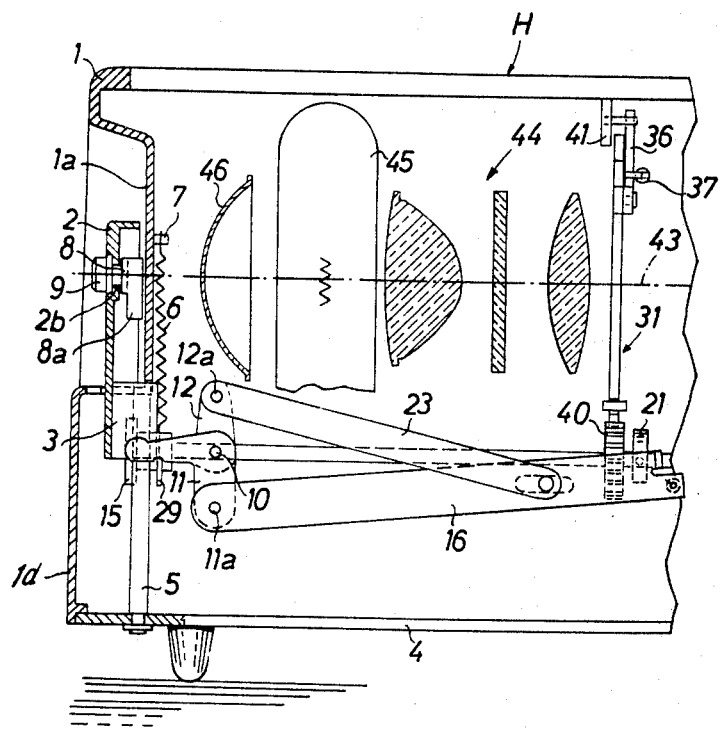

The present invention relates to projectors in general, and more particularly to an improved projector for slide transparencies, hereinafter called slides for short. Still more particularly, the invention relates to improvements in so-called semiautomatic slide projectors wherein the slides may be moved to or from a magazine in response to manually induced displacements of an actuating member.

In many heretofore known semiautomatic slide projectors of which we are aware at this time, the combined slide transferring and magazine transporting mechanism is operated by an actuating member which is movable in a horizontal path at right angles to the optical axis. Therefore, and in order to avoid overturning of the projector housing and/or lateral displacement of the projector along a table or another support, the housing of the projector must be relatively wide and heavy to withstand the force which is required to shift the actuating member in such horizontal path. As a rule, the projector housing must be braced by hand or by a relatively heavy object to prevent lateral displacement because such lateral displacement could cause shifting of the projected image off the surface of the projection screen.

In accordance with a more recent proposal, semiautomatic slide projectors are provided with vertically reciprocable actuating members which are mounted on the front wall of the projector housing. A serious drawback of such actuating members is that they are not readily accessible. Furthermore, such actuating members can effect only a forward movement of the magazine so that the slides can be observed solely in a single sequence, namely, in the same sequence in which they are placed into the magazine.

It is, therefore, an important object of our present invention to provide an improved semiautomatic slide projector wherein the actuating member which effects movements of the slide transferring and magazine transporting mechanism is mounted in a novel way and in such position that it is readily accessible when the projector is in actual use.

Another object of the invention is to provide a slide projector wherein the structure which sets the mechanism for forward or backward movement of the magazine is automatically concealed or is at least out of reach when the actuating member is moved from its rest position so as to prevent accidental changes in the position of parts which are in the process of moving the magazine and/or transferring a slide to or from a projection position.

A further object of the invention is to provide the slide projector with an improved mechanism wherein the units for effecting movements of the magazine and for effecting transfer of slides are assembled into an integrated structure which occupies little room and which is of rugged and simple construction so that it can readily withstand long periods of use.

An additional object of the invention is to provide a novel slide transferring unit and to construct the slide transferring unit in such a way that its operation is properly synchronized with the operation of the magazine advancing or transporting unit.

A concomitant object of the instant invention is to provide a slide projector wherein all such component parts which must be manipulated by hand are closely adjacent to each other and are located in such position with reference to the projection lens that they may be manipulated without interfering with the projection of images.

Briefly stated, one feature of our invention resides in the provision of a slide projector which comprises a housing having a rear wall preferably provided with a recess which is accessible from the rear of the projector, a slide magazine supported in or on the housing for forward and backward movement in parallelism with the axis of the optical system of the projector, a mechanism for transporting the magazine with reference to the housing and for transferring slides to and from the magazine so that, when withdrawn from the magazine and placed into a projection position, the slides are located in a plane which intersects the optical axis, an actuating member mounted on the rear wall of the housing for movement up and down to and from a position of rest and operatively connected with the aforementioned mechanism to effect movements of the magazine and the transfer of slides, and a selector which is movably mounted on the actuating member and serves to set the mechanism for forward and backward movement of the magazine. The up and down movements of the actuating member preferably take place at right angles to the direction in which the slides are being transferred to or from the magazine, and the selector is preferably reciprocable in a horizontal path so as to move to at least two but preferably three positions in one of which the mechanism can transport the magazine forwardly, in another of which the mechanism can transport the magazine backwards, and in a third of which manual depression of the actuating member from its rest position and against the bias of a spring or the like does not result in movement of the magazine but permits for manual displacement of the magazine with reference to the housing so that the magazine may be removed or manually shifted to a position in which a selected slide is ready for transfer to projection position.

Certain other features of our invention resides in the provision of two integrated units which together constitute the aforementioned mechanism and one of which effects transfer of slides while the other transports the magazine with reference to the housing. The arrangement is preferably such that a slide is returned into the magazine in response to depression of the actuating member and that a slide is withdrawn from the magazine when the actuating member is released and automatically returns to the position of rest. The rear wall of the magazine is preferably provided with a shield which prevents the operator from gaining access to the selector when the actuating member is depressed so that the operator cannot accidentally change the position of the selector when the one or the other unit of the mechanism is in operation.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of a specific embodiment with reference to the accompanying drawings, in which:

FIG. 1 is a fragmentary longitudinal vertical section through the rear part of a slide projector which embodies our invention; and FIG. 2 is a fragmentary perspective view of the slide transferring and magazine transporting mechanism.

Referring to the drawings in detail, there is shown a portion of a slide projector which comprises a housing H having a rear wall 1 which is provided with a recess 1a. This recess accommodates a vertically reciprocable actuating member 2 whose function is to initiate the transfer of slides and displacement of the magazine. A bearing block 3 at the lower end of the actuating member 2 is reciprocable in a cutout provided in the rear wall 1 and extending downwardly from the recess 1a, and this bearing block 3 is slidable on an upright guide member or post 5 which is affixed to the bottom wall or foundation plate 4 of the housing H. A vertically extending lateral flange of the actuating member 2 is formed with a forwardly projecting lug 2a which is connected with the lower end of the helical return spring 6. The upper end of this spring is attached to a pin 7 which is affixed to the rear wall 1 so that the actuating member 2 is permanently biased to an upper end position of rest.

The actuating member 2 resembles a drawer with its lower end wall removed, and its interior accommodates a horizontally reciprocable selector 8 having a rearwardly extending knob 9 which is guided in a horizontal slot 2b provided in the actuating member. In other words, the knob 9 is readily accessible from the rear side of the housing H and is compelled to share all reciprocatory movements of the actuating member 2. When the actuating member is depressed against the bias of the spring 6, the knob 9 is concealed by a shield 1d forming part of or attached to the rear wall 1 and overlying the lower part of the recess 1a. The arrow B indicates the directions in which the knob 9 may be reciprocated by the operator.

Selector 8 comprises a vertically extending flat platelike portion or trip 8a which can be moved to several positions best shown in FIG. 2. Such positions are respectively indicated by the characters V, R and M. When held in one of such positions, and when the actuating member 2 is depressed, the trip 8a can rock one of two bell crank levers 11, 12 or abuts against the top end face 5a of the post 5. The levers 11, 12 will be rocked when the trip 8a is respectively moved to the positions V and R.

The actuating member 2 further comprises a vertical rack 13 which meshes with a pinion 15 provided at the rear end of a horizontal shaft 14. The shaft 14 is journalled in the housing H and forms part of the combined magazine transporting and slide transferring mechanism. The parts 13, 15 together constitute a transmission which converts reciprocating movements of the actuating member 2 into rotary movements of the shaft 14.

The lever 11 is mounted on a horizontal pivot pin 10 and is articulately coupled with a motion transmitting link 16 by means of a pin 11a. The pin 10 is mounted in the housing H and also carries the lever 12, the latter being articulately coupled to a second motion transmitting link 23 by means of a pin 12a. The forward end of the link 16 is provided with a projection or lug 16a which is connected with one end of a helical contraction spring 17. The other end of the spring 17 is attached to a pin 18 which is affixed to the housing H and tends to shift the forward end of the link 16 in a direction to the right, as viewed in FIG. 2, whereby the link 16 bears against one end of a rod-shaped follower 19 which is guided in a fixed sleeve bearing 20. The other end of the follower 19 bears against the face of a disk cam 21 which is attached to the forward end of the shaft 14. When it is shifted laterally by the follower 19, a projecting portion or tooth 16b at the forward end of the links 16 may enter one of several notches or apertures provided in the wall or rail of a slide magazine 22 to transport this magazine forwardly by a step in response to depression of the actuating member 2 provided that the trip 8a of the selector 8 registers with and rocks the lever 11 at the rear end of the link 16. When the trip 8a registers with the lever 12 and the actuating member 2 is depressed, the link 23 is moved rearwardly and causes the tooth 16b to transport the magazine 22 backwards, i.e., in a direction toward the rear wall 1. The magazine 22 is supported in or on the housing H and is reciprocable in parallelism with the optical axis 43 of the projector. The links 16, 23 are coupled to each other by a pin 24 which is slidable in a guide slot 25 provided in a stationary part of the housing H. It will be noted that the pins 11a, 12a and the levers 11, 12 are mirror symmetrical to each other with reference to the pivot pin 10, and such mounting of levers 11, 12 enables the links 16, 23 to respectively effect forward (V) and reverse or backward (R) movements of the magazine 22. In other words, and referring to FIG. 2, the levers 11, 12 are rockable by the trip 8a in a counterclockwise direction whereby the link 16 moves forwardly and the link 23 moves rearwardly. The link 16 shares all movements of the link 23, and vice versa. A restoring lever 29 is rockable on a fixed pivot pin 26 and is biased by a helical spring 27 which tends to rock the lever 29 in a counterclockwise direction and causes the levers 11, 12 to normally assume their idle positions. The restoring lever 29 then abuts against a fixed stop pin 28.

The slide transferring unit of the aforementioned mechanism further comprises a specially configurated plate-like shifter 31 which can move a slide 30 to and from the image projecting position shown in FIG. 2. In such projecting position, the plane of the slide 30 intersects the optical axis 43 of the condenser lens system 44 and is located in front of the projection lamp 45. The projection lens (not shown) is located in front of the slide 30, and the numeral 46 denotes a reflector which is located between the lamp 45 and the rear wall 1. The shifter 31 carries bolts 32, 34 which respectively extend through horizontal guide slots 33, 35 machined into a clamping member 36 having a jaw 36a which can move into abutment with one edge face of the frame forming part of the slide 30. A projection 36b of the clamping member 36 is coupled with the shifter 31 by a helical spring 38 which is attached to a pin 37 carried by the shifter. The spring 38 tends to move the clamping member 36 in a direction to the left, as viewed in FIG. 2. When the slide 30 is properly engaged by the jaw 36a, the left-hand edge face of its frame is engaged by a downwardly extending jaw 31a of the shifter 31, and the slide then rests on a horizontal guide rail 39. The latter may define a channel to insure more accurate guidance of the slide.

The lower edge portion of the shifter 31 constitutes a rack 31b and meshes with a pinion 40 which is mounted on the shaft 14. When the actuating member 2 is depressed (arrow A in FIG. 2), the rack 13 causes the pinions 15 and 40 to rotate with the shaft 14 whereby the rack 31b moves the shifter 31 in the direction indicated by an arrow C. Prior to completion of such movement of the shifter 31, the projection 36b engages a stop 41 which is secured to the housing H so that the clamping member 36 comes to a halt but the shifter 31 continues to move toward the magazine 22. In this manner, the slide 30 is disengaged from the jaws 31a, 36a. If the trip 8a of the selector 8 is moved to the position M, it can descend into abutment with the top end face 5a of the post 5 as soon as the actuating member 2 is depressed. The cam face of the cam 21 on the shaft 14 is configurated in such a way that the tooth 16b of the link 16 does not as yet extend into the magazine 22 when the trip 8a abuts against the post 5. This means that the magazine 22 may be shifted manually to move a selected slide into registry with the shifter 31. In other words, all that is necessary to allow for manual shifting of the magazine (or for detachment of the magazine from the housing H) is to move the selector 8 to the position M (manual) and to depress the actuating member 2 against the bias of the spring 6. The post 5 then prevents excessive rotation of the cam 21 and the spring 17 insures that the tip of the tooth 16b remains spaced from and cannot be coupled to the magazine 22. This position M is necessary not only to enable the operator to move the magazine relative to the housing H without resorting to the tooth 16b, but also to remove the magazine or to attach a new magazine to the housing H. A leaf spring 42 which is attached to the housing H is provided with a bent-over sensing portion which can ratchet along the notches of the magazine 22 to thus enable the operator to "feel" when a slide is moved into registry with the shifter 31. This sensing portion of the spring 42 constitutes a yieldable coupling between the housing H and the magazine 22. When the actuating member 2 is released, the spring 6 contracts and rotates the shaft 14 in a sense to move the shifter 31 in a direction to the right, as viewed in FIG. 2, whereby the jaw 31a automatically entrains a slide 30 into projection position across the optical axis. The thus displaced slide 30 is automatically engaged by the spring-biased jaw 36a of the clamping member 36 because the projection 36b of this clamping member then moves away from the fixed stop 41.

If the selector 8 is moved to the position V (forward) or into the position R (reverse), the actuating member 2 may be depressed all the way because the movement of the trip 8a is not obstructed by the post 5. The trip 8a then rocks the lever 11 or 12 to move the link 16 forwardly or backwards (see the double-headed arrow D shown in FIG. 2). Shortly before the trip 8a actually engages the lever 11 or 12, the shaft 14 has already rotated through such an angle that the cam 21 causes the tooth 16b to enter a notch of the magazine 22 so that the magazine begins to move forwardly or rearwardly, depending upon whether the trip 8a rocks the lever 11 or 12, respectively. The configuration of the peripheral cam face on the cam 21 is preferably such that the tooth 16b reenters a notch of the magazine 22 when the actuating member 2 returns to its position of rest whereby the magazine 22 is safely locked against uncontrolled displacement when the image of a selected slide is being projected onto a screen.

The sequence in which the shifter 31 can remove and return a slide 30 is as follows: Let it be assumed that the trip 8a registers with the lever 11 and that the actuating member 2 is thereupon depressed. Let it also be assumed that the foremost slide 30 in the magazine 22 is directly behind the plane of the shifter 31. The shifter is then free to move in the direction indicated by the arrow C and reaches its left-most position (as viewed in FIG. 2) when the tooth 16b has advanced the magazine 22 by a full step. The jaw 36a of the clamping member 36 is spaced from the path of the slides 30 because the projection 36b is held by the stop 41. Therefore, the foremost slide 30 can enter the space between the jaws 31a, 36a and is automatically moved to projection position when the actuating member 2 is released so that it can move upwardly in response to the bias of the spring 6. The spring 27 causes the restoring lever 29 to rock the lever 11 back to the position of FIG. 2 so that the link 16 is retracted; however, during such upward movement of the lever 11, the spring 17 maintains the tooth 16b at a slight distance from the magazine 22 so that the latter need not share in return movement of the link 16. Also, and while the actuating member 2 moves upwardly under the bias of its spring 6, the pinion 40 shifts the rack 31b so that the jaw 31a moves to the right and entrains the slide 30. As the slide 30 begins to move out of the magazine 22, it is engaged by the jaw 36a of the clamping member 36 and the parts 31, 36 thereupon move in unison until the slide reaches the projection position. Just before the slide 30 reaches such position, the cam 21 shifts the follower 19 sufficiently to introduce the tooth 16b of the link 16 into the adjoining notch of the magazine 22 and the latter is locked against uncontrolled displacement. During the next following depression of the actuating member 2, the slide 30 is first returned into the magazine 22 and the latter then advances by a step to move the next slide into the space between the jaws 31a, 36a. The jaw 31a is "waiting" and withdraws the next slide as soon as the actuating member 2 is released. The same procedure is repeated in response to each depression of the actuating member, regardless of whether the trip 8a registers with the lever 11 or 12 excepting, of course, that the magazine 22 will move backwards if the trip 8a is moved to the position R. In the position M, the trip 8a will allow the parts 31, 36 to return a slide into the magazine but the tooth 16b remains detached from the magazine because the actuating member 2 cannot be depressed all the way to its lower end position.

Since the actuating member 2 is mounted on and is readily accessible from the exposed side of the rear wall 1, the person operating the projector can sit comfortably behind the rear wall and is in a position to operate the member 2 as well as the selector 8 by using only one hand. Also, this same person can transport the magazine manually after the trip 8a is moved to the position M and the actuating member 2 is depressed against the bias of the return spring 6.

The stop 41 is positioned in such a way that a slide 30 which is being returned into the magazine 22 comes to a halt at the time when it is properly located in the magazine because the projection 36b of the clamping member 36 abuts against the stop 41 in accurately determined position of the slide. Once the slide is returned into the space allotted therefor in the magazine 22, the latter advances by a step and places the next-following slide (i.e., the preceding or the trailing slide) into registry with the jaws 31a and 36a. Thus, and without resorting to special cams or similar control elements, we insure that the jaws 31a, 36a open and close at an optimum stage of the operation of the combined magazine transporting and slide transferring mechanism. The parts 13–15 and 31–41 can be said to constitute the slide transferring unit and the parts 10–12, 16–21 and 23–29 can be said to constitute the magazine transporting unit of the mechanism.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a slide projector, a housing having a rear wall; a slide magazine supported by said housing for forward and backward movement; a transporting mechanism actuatable to transport said magazine with reference to said housing and to transfer slides individually to and from said magazine; a direction changing mechanism for selecting the direction of transportation of said magazine by said transporting mechanism between forward and backward movements; first and second motion transmitting means respectively extending to said rear wall from said transporting mechanism and from said direction changing mechanism an actuating member connected to said first motion transmitting means and mounted on said rear wall for movement in a predetermined direction between a position of rest and an operative position to actuate the transporting mechanism by way of said first motion transmitting means in said operative position thereof; and a selector connected to said second motion transmitting means and mounted on said actuating member for movement in a direction which is different from said predetermined direction to set said direction changing mechanism by way of said second motion transmitting means.

2. A structure as set forth in claim 1, wherein said rear wall has an outer side provided with a recess, said actuating member being accommodated in said recess and said transporting mechanism being arranged to transfer the slides in a direction at right angles to the direction of movement of said actuating member.

3. A structure as set forth in claim 1, wherein said housing comprises a shield which interferes with access to said selector when said actuating member is moved from the position of rest.

4. In a slide projector, a housing having a rear wall; a slide magazine supported by said housing for forward and backward movement; a mechanism for transporting said magazine with reference to said housing and for transferring slides individually to and from said magazine; an actuating member mounted on said rear wall for movement up and down to and from a position of rest and operatively connected with said mechanism to effect movements of the magazine and the transfer of slides; and a selector movably mounted on said actuating member to set the mechanism for forward and backward movement of the magazine, said mechanism comprising a slide transferring unit which is permanently coupled with said actuating member and a magazine transporting unit which is arranged to receive motion from said actuating member through the intermediary of said selector, said slide transferring unit comprising a rack provided on said actuating member and a pinion meshing with said rack and said selector comprising a portion movable to a pair of positions to respectively actuate said magazine advancing unit for forward and backward movement of the magazine in response to movement of the actuating member from said position of rest.

5. A structure as set forth in claim 4, wherein said magazine advancing unit comprises a pivot, a pair of mirror symmetrical levers mounted on said pivot and each located in the path of said selector portion in one of said pair of positions, and a motion transmitting member operatively connected with said levers and movable forwardly when displaced by one of said levers and backwards when displaced by the other lever, said motion transmitting member having a portion movable into and out of direct engagement with the magazine.

6. A structure as set forth in claim 5, wherein said portion of said motion transmitting member comprises a tooth and the magazine is provided with notches in a distribution corresponding to the distribution of slides therein, said tooth being movable into consecutive notches in response to repeated movements of said actuating member from the position of rest.

7. A structure as set forth in claim 6, wherein said magazine advancing unit further comprises a cam rotatable by said pinion and arranged to move said tooth into one of said notches in response to movement of said actuating member from the position of rest.

8. In a slide projector, a housing having a rear wall; a slide magazine supported by said housing for forward and backward movement; a mechanism for transporting said magazine with reference to said housing and for transferring slides individually to and from said magazine; an actuating member mounted on said rear wall for movement up and down to and from a position of rest and operatively connected with said mechanism to effect movements of the magazine and the transfer of slides; and a selector movably mounted on said actuating member to set the mechanism for forward and backward movement of the magazine, said mechanism comprising a slide transferring unit which is permanently coupled with said actuating member and a magazine transporting unit which is arranged to receive motion from said actuating member through the intermediary of said selector, said selector being movable to a position in which it blocks the operation of said magazine transporting unit so that the magazine may be shifted manually with reference to said housing, said selector comprising a trip and said housing comprising a stop which is located in the path of said trip when the selector is moved to said position thereof, said actuating member being arranged to effect transfer of a slide into the magazine via said slide transferring unit before said trip reaches said stop to thus prevent further movement of said actuating member in a direction away from said position of rest.

9. In a slide projector, a housing having a rear wall; a slide magazine supported by said housing for forward and backward movement; a mechanism for transporting said magazine with reference to said housing and for transferring slides individually to and from said magazine; an actuating member mounted on said rear wall for movement up and down to and from a position of rest and operatively connected with said mechanism to effect movements of the magazine and the transfer of slides; and a selector movably mounted on said actuating member to set the mechanism for forward or backward movement of the magazine, said mechanism comprising a slide transferring unit which is permanently coupled with said actuating member and a magazine transporting unit which is arranged to receive motion from said actuating member through the intermediary of said selector, said slide transferring unit comprising a slide shifter which is reciprocable in a horizontal path at right angles to the optical axis of the projector, a shaft which is parallel with the optical axis, a pair of pinions mounted on said shaft, a first rack provided on said actuating member and meshing with one of said pinions, and a second rack provided on said shifter and meshing with the other pinion.

10. A structure as set forth in claim 9, further comprising resilient means for permanently biasing said actuating member to the position of rest.

11. A structure as set forth in claim 10, wherein said magazine comprises a notched portion and said magazine transporting unit comprises a link having a tooth receivable in one notch at a time, lever means for moving said link backwards and forwards in response to different adjustments of said selector with reference to said actuating member, resilient means for permanently biasing said tooth away from the magazine, and cam and follower means operated by said slide transferring unit for intermittently moving said tooth into the registering notch of said magazine.

12. A structure as set forth in claim 11, further comprising resilient sensing means for yieldably coupling the magazine to said housing, said magazine being reciprocable in parallelism with the optical axis of the projector.

References Cited
UNITED STATES PATENTS

| | | | |
|---|---|---|---|
| 2,878,604 | 3/1959 | Mulch | 40—79 |
| 3,160,972 | 12/1964 | Hall | 40—79 |
| 3,165,971 | 1/1965 | Zillmer et al. | 40—79 X |

EUGENE R. CAPOZIO, *Primary Examiner.*

R. CARTER, *Assistant Examiner.*